Patented Feb. 21, 1939

2,147,762

UNITED STATES PATENT OFFICE 2,147,762

YEAST CULTURE IN BREAD MAKING AND YEAST PROPAGATION

Roger J. Williams, Corvallis, Oreg., assignor to Standard Brands Incorporated, New York, N. Y., a corporation of Delaware No Drawing. Application March 26, 1936, Serial No. 71,071

18 Claims. (Cl. 99—90)

This invention relates to the culturing of yeast and has for its object the provision of specific nutrients and methods for stimulating yeast growth.

Yeasts are produced commercially by growth of cultures of the desired types in media which provide the necessary food materials to nourish the growing plants. Among the media used are solutions made from grain mashes, beet molasses, cane molasses and the like, to which supplemental materials such as ammonia or ammonium compounds, phosphates or other mineral substances have been added in certain cases. Synthetic media containing sugars and salts may also be employed for yeast culture. After the yeast plants have grown and increased in amount and numbers, they are separated from the medium and further treated to produce either a wet or a dry product, which may itself be used as a food ingredient, or for the production of fermentation products in other media, or for leavening as in bread making. In some cases as in brewing, distilling, wine making, etc., the yeast crop itself may be without much value but its propagation in the medium is necessary for producing the desired amount of fermentation products.

I have discovered that the rate of growth of yeast plants is greatly accelerated by the addition to the media of certain specific organic acids, namely beta alanine, either separately or in combination with aspartic acid. Beta alanine or beta amino propionic acid though a relatively rare chemical has been known for a number of years and has been given the formula $C_3H_7O_2N$. Aspartic acid or amino succinic acid has long been known as one of the amino acids resulting from the decomposition of proteins and has been given the formula $C_4H_7O_4N$. Salts of these amino acids or other derivatives which under the conditions existing in the culture medium would yield these acids are considered to be the equivalents of beta alanine and aspartic acid respectively. In the experiments cited below synthetic beta alanine and natural aspartic acid (so-called l-aspartic acid) were used but these facts are cited as examples and not to limit the invention to the particular forms used. I have found that while beta alanine gives accelerated yeast growth, nevertheless its use simultaneously with aspartic acid gives in some cases at least, accelerations greater than can be attained by beta alanine alone. Different strains of yeast behave somewhat differently to these substances as is indicated by the results given below.

Furthermore I have found that other acids such as beta amino butyric acid and nicotinic acid which are structurally related to beta alanine in that they have nitrogen attached only on the beta position with respect to carboxyl, have the ability to affect yeast growth when used in low concentrations. These particular acids are mentioned as examples, however, and not to limit the invention to these specific acids, or to derivatives which yield them in the culture medium.

The effect of adding one part of beta alanine hydrochloride alone to 12,000,000 parts by weight of culture medium was to increase the yeast crop 3.9 times in the case of "Gebruder Mayer" yeast; 2.85 times in the case of W. Lash Miller's yeast; 4.1 times in the case of "Rasse M" yeast (Kogl) and 1.12 times in the case of Wildiers' yeast.

The effect of adding one part of aspartic acid (as the ammonium salt) to 16,000 parts by weight of culture medium was to cause no increase in the case of "Gebruder Mayer" yeast, an increase to 1.7 times the control in the case of W. Lash Miller's yeast, a negligible increase in the case of "Rasse M" yeast (Kogl) and an increase to 1.6 times the control in the case of Wildiers' yeast.

When both beta alanine hydrochloride and ammonium aspartate were added together in the proportions indicated above, the crop of "Gebruder Mayer" yeast was 5.9 times that of the control, the crop of W. Lash Miller's yeast was 9.3 times that of the control, the crop of Rasse M yeast (Kogl) was 7.1 times that of the control, and the crop of Wildiers' yeast was 4.4 times that of the control culture.

In all of the above procedures the culture medium contained the requisite sugar, inositol, ammonia, phosphorus, lime, potash, and magnesium compounds together with the "trace elements" thallium, manganese, boron, iron, copper and iodine. Included in the above media are all the known chemicals which are required for yeast nutrition. The control cultures and those to which additions were made were treated and seeded exactly alike and the environmental conditions during growth were the same except for the presence or absence of beta alanine and/or aspartic acid as indicated.

While in the experiments cited the same proportion of beta alanine was used throughout and a higher though constant proportion of aspartic acid was used, these amounts are not critical nor necessarily optimal. The optimum amounts to be used will depend, as will be understood by one skilled in the art, on the type of yeast, conditions of growth, kind of medium, etc. The examples are given for the purposes of illustration only and not as limitations of the invention. Likewise the particular yeasts are cited merely as examples and not as limitations of the invention. Likewise, while a synthetic medium made up from chemicals of ordinary purity, was used in the experiments cited, this is used for illustration and not to limit the invention to its use in connection with this particular type of medium.

All of the other members of the amino acid group of compounds have nitrogen attached to the alpha position with respect to a carboxyl group, some have nitrogen attached to the gamma, delta and epsilon positions but not to the beta position. None of these when added to yeast cultures in like amounts causes stimulation. Compounds such as tartaric acid and malic acid which are structurally related to aspartic acid but contain no nitrogen also are without effect even when used in relatively high doses. Asparagin which is the acid amide of aspartic acid in some cases at least plays a role similar to that of aspartic acid itself, though it is not as effective.

Additions of beta alanine and acids with related structure, or derivatives of these, separately or in combination with aspartic acid, may be used to accelerate the growth or modify the quality of yeast in cultures, for the production of the yeast itself, or they may be added to batches, or solutions, or mixtures in which the yeast growth functions to bring about desired chemical or physical reactions, such as in the fermentation process for alcohol or in the leavening of bread.

I claim:

1. A nutrient medium for yeast which comprises a yeast assimilable carbohydrate material, a yeast nutrient inorganic salt and a monocarboxylic organic acid having nitrogen attached only to the beta position with respect to carboxyl.

2. A nutrient medium for yeast which comprises a yeast assimilable carbohydrate material, a yeast nutrient inorganic salt, and beta alanine.

3. A nutrient medium for yeast which comprises a yeast assimilable carbohydrate material, a yeast nutrient inorganic salt, beta alanine, and aspartic acid.

4. A nutrient medium for yeast which comprises a yeast assimilable carbohydrate material, a yeast nutrient inorganic salt, and beta amino butyric acid.

5. A method for stimulating activity of yeast which comprises preparing a nutrient medium containing a yeast assimilable carbohydrate material, a yeast nutrient inorganic salt, and a monocarboxylic organic acid having an amino group attached only to the beta position with respect to carboxyl, incorporating yeast with said nutrient medium, and allowing the yeast to act therein.

6. A method for stimulating activity of yeast which comprises preparing a nutrient medium containing a yeast assimilable carbohydrate material, a yeast nutrient inorganic salt, and beta alanine, incorporating yeast with said nutrient medium, and allowing the yeast to act therein.

7. A method for stimulating activity of yeast which comprises preparing a nutrient medium containing a yeast assimilable carbohydrate material, a yeast nutrient inorganic salt, beta alanine and aspartic acid, incorporating yeast with said nutrient medium, and allowing the yeast to act therein.

8. A method for stimulating growth of yeast which comprises preparing a nutrient medium containing a yeast assimilable carbohydrate material, a yeast nutrient inorganic salt, and a monocarboxylic organic acid having an amino group attached only to the beta position with respect to carboxyl, seeding said nutrient medium with yeast, propagating the yeast therein, and separating yeast from the medium.

9. A method for stimulating growth of yeast which comprises preparing a nutrient medium containing a yeast assimilable carbohydrate material, a yeast nutrient inorganic salt, and beta alanine, seeding said nutrient medium with yeast, propagating the yeast therein, and separating yeast from the medium.

10. A method for stimulating growth of yeast which comprises preparing a nutrient medium containing a yeast assimilable carbohydrate material, a yeast nutrient inorganic salt, beta alanine and aspartic acid, seeding said nutrient medium with yeast, propagating the yeast therein, and separating yeast from the medium.

11. A method for the production of bread which comprises incorporating a monocarboxylic organic acid having an amino group attached only to the beta position with respect to carboxyl with flour, water, yeast, sugar, and other ingredients entering into the preparation of a dough.

12. A method for the production of bread which comprises incorporating beta alanine with flour, water, yeast, sugar, and other ingredients entering into the preparation of a dough.

13. A method for the production of bread which comprises incorporating beta alanine and aspartic acid with flour, water, yeast, sugar, and other ingredients entering into the preparation of a dough.

14. A nutrient medium for yeast which comprises a yeast assimilable material and a monocarboxylic organic acid having nitrogen attached only to the beta position with respect to carboxyl.

15. A nutrient medium for yeast which comprises a yeast assimilable material and beta alanine.

16. A nutrient medium for yeast which comprises a yeast assimilable carbohydrate material, a yeast nutrient inorganic salt and nicotinic acid.

17. A nutrient medium for yeast which comprises a yeast assimilable material and beta amino butyric acid.

18. A nutrient medium for yeast which comprises a yeast assimilable material and nicotinic acid.

ROGER J. WILLIAMS.